(12) United States Patent
Bartlett

(10) Patent No.: US 8,510,706 B1
(45) Date of Patent: Aug. 13, 2013

(54) GENERATING COMMENTS FOR CODE GENERATED FROM A MODEL

(75) Inventor: Andrew C Bartlett, Westborough, MA (US)

(73) Assignee: The Mathworks, Inc., Natick, MA (US)

( * ) Notice: Subject to any disclaimer, the term of this patent is extended or adjusted under 35 U.S.C. 154(b) by 1013 days.

(21) Appl. No.: 12/554,547

(22) Filed: Sep. 4, 2009

(51) Int. Cl.
*G06F 9/44* (2006.01)

(52) U.S. Cl.
USPC .......................................................... 717/105

(58) Field of Classification Search
None
See application file for complete search history.

(56) References Cited

U.S. PATENT DOCUMENTS 6,874,140 B1 * 3/2005 Shupak ........................ 717/131
2006/0294502 A1 * 12/2006 Das et al. ...................... 717/129

* cited by examiner

*Primary Examiner* — Steven Snyder
*Assistant Examiner* — Juanito Borromeo
(74) *Attorney, Agent, or Firm* — Harrity & Harrity, LLP

(57) ABSTRACT

In an embodiment, a technique for generating a comment for an entity associated with a model. The comment may be generated based on at least (1) a structural usage of the entity and (2) a dynamically-specified rule that is associated with the structural usage of the entity. The rule may be used to control content of the comment. The comment may be incorporated in generated code for the model and the generated code including the comment may be outputted (e.g., displayed, stored).

30 Claims, 16 Drawing Sheets

```
T1 /* Signal C */ = T1 /* Signal A */ + T2 /* Signal B */;          920
T1 /* Signal E */ = T1 /* Signal C */ * T3 /* Signal D */;
```

```
/*
*       T1 read is Signal A
*       T2 read is Signal B
*       T1 write is Signal C
*/
T1 = T1 + T2;                                                        930

/*
*       T1 read is Signal C
*       T3 read is Signal D
*       T1 write is Signal E
*/
T1 = T1 * T3;
```

```
/*
*       Usage of T1 are Signal A, Signal C, and Signal E             940
*/
double T1 = 0.0;
```

```
/*
*       T1 read is Signal A
*       T2 read is Signal B
*       Expression (T1 + T2) is Signal C                             950
*       T3 read is Signal D
*       T1 write is Signal E
*/
T1 = (T1 + T2) * T3;
```

```
T1 /* Signal C */ = T1 /* Signal A */ + T2 /* Signal B */;
T1 /* Signal E */ = T1 /* Signal C */ * T3 /* Signal D */;
```
— 920

```
/*
 *      T1 read is Signal A
 *      T2 read is Signal B
 *      T1 write is Signal C
 */
T1 = T1 + T2;

/*
 *      T1 read is Signal C
 *      T3 read is Signal D
 *      T1 write is Signal E
 */
T1 = T1 * T3;
```
— 930

```
/*
 *      Usage of T1 are Signal A, Signal C, and Signal E
 */
double T1 = 0.0;
```
— 940

```
/*
 *      T1 read is Signal A
 *      T2 read is Signal B
 *      Expression (T1 + T2) is Signal C
 *      T3 read is Signal D
 *      T1 write is Signal E
 */
T1 = (T1 + T2) * T3;
```
— 950

FIG. 9

GENERATING COMMENTS FOR CODE GENERATED FROM A MODEL

BACKGROUND

Modeling environments may include textual modeling environments and/or graphical modeling environments that may be used to generate, compile, and/or execute one or more models that represent systems. Modeling environments may cater to various aspects of dynamic system simulation, synthesis, analysis, and design. Such modeling environments may allow users to perform numerous types of tasks including, for example, constructing and simulating models.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 9 illustrates example listings of code that includes comments that may be generated for a model;

DETAILED DESCRIPTION

The following detailed description refers to the accompanying drawings. The same reference numbers in different drawings may identify the same or similar elements. Also, the following detailed description does not limit the invention.

One or more embodiments of the invention may be implemented on one or more computing devices. The one or more computing devices may be a system or part of a system. The one or more computing devices may include a desktop computer, a laptop computer, a client computer, a server computer, a mainframe computer, a personal digital assistant (PDA), a web-enabled cellular telephone, a smart phone, a smart sensor, a smart actuator, or some other computing device.

Figure 1:
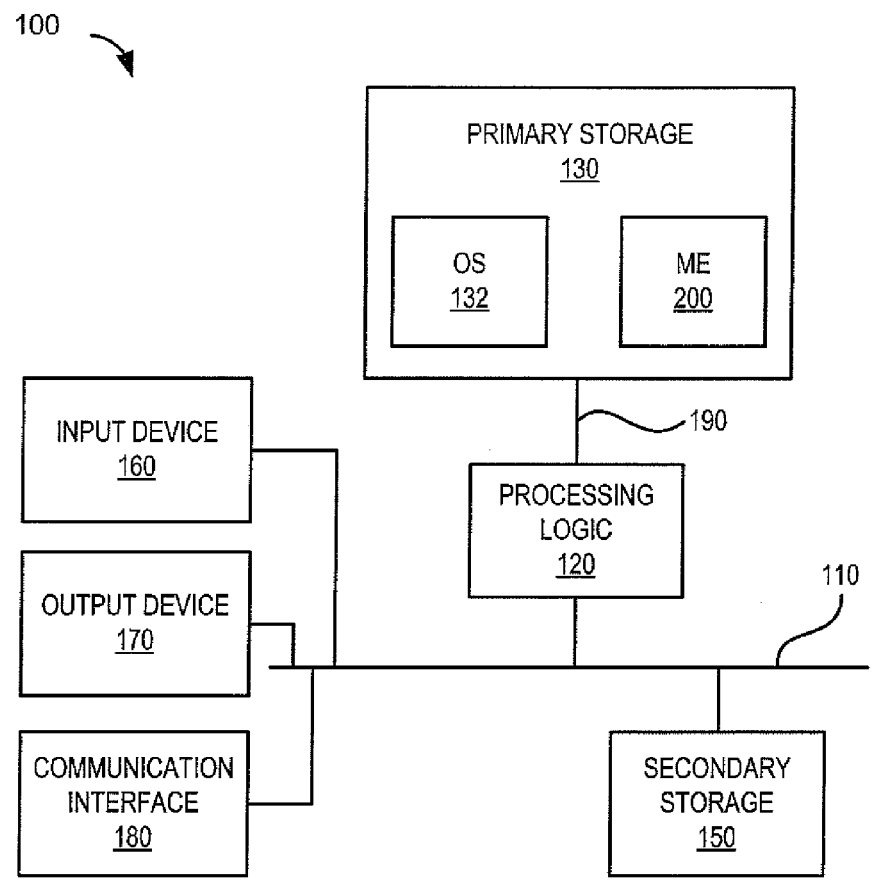
FIG. 1 illustrates an example of a computing device that may be configured to implement one or more embodiments of the invention.

FIG. 1 illustrates an example of a computing device 100 that may be configured to implement one or more embodiments of the invention. Referring to FIG. 1, the computing device 100 may comprise one or more components including an input-output (I/O) bus 110, processing logic 120, a primary storage 130, a secondary storage 150, an input device 160, an output device 170, a communication interface 180, and a memory bus 190. Computing device 100 is one example of a computing device that may be configured to implement one or more embodiments of the invention. It should be noted that other computing devices that may be less complicated or more complicated than computing device 100 may be configured to implement one or more embodiments of the invention.

The I/O bus 110 may be an interconnect bus configured to enable communication among various components in the computing device 100, such as processing logic 120, secondary storage 150, input device 160, output device 170, and communication interface 180. The communication may include, among other things, transferring information (e.g., control information, data) between the components.

The memory bus 190 may be an interconnect bus configured to enable information to be transferred between the processing logic 120 and the primary storage 130. The information may include instructions and/or data that may be executed, manipulated, and/or otherwise processed by processing logic 120. The instructions and/or data may include instructions and/or data that are configured to implement one or more embodiments of the invention.

The processing logic 120 may include logic configured to interpret, execute, and/or otherwise process information contained in, for example, the primary storage 130 and/or secondary storage 150. The information may include instructions and/or data configured to implement one or more embodiments of the invention. The processing logic 120 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units, or other types of processing logic that may interpret, execute, manipulate, and/or otherwise process the information. The processing logic 120 may comprise a single core or multiple cores. An example of a processor that may be used to implement processing logic 120 is the Intel Xeon processor available from Intel Corporation, Santa Clara, Calif.

The secondary storage 150 may be a tangible computer-readable media that is accessible to the processing logic 120 via I/O bus 110. The secondary storage 150 may be configured to store information for the processing logic 120. The information may be executed, interpreted, manipulated, and/or otherwise processed by the processing logic 120. The secondary storage 150 may comprise, for example, a storage device, such as a magnetic disk, optical disk, random-access memory (RAM) disk, flash drive, etc. The information may be stored on one or more computer-readable media contained in the storage device. Examples of media that may be contained in the storage device may include magnetic discs, optical discs, and memory devices (e.g., flash memory devices, static RAM (SRAM) devices, dynamic RAM (DRAM) devices, or other memory devices). The information may include data and/or computer-executable instructions that may implement one or more embodiments of the invention.

The input device 160 may include one or more mechanisms that may be used to input information into computing device 100. The mechanisms may include, for example, a keyboard, card reader, microphone, scanner, camera, computer mouse, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, eye tracking device, steering wheel, yoke, jog dial, space ball, directional pad, dance pad, soap mouse, haptic device, tactile device, neural device, discrete pointing device, or some other mechanism. The information may include spatial (e.g., continuous, multi-dimensional) data that may be input into computing device 100 using, for example, a pointing device, such as a computer mouse. The information may also include other forms of data, such as text, that may be input using, for example, a keyboard.

The output device 170 may include one or more mechanisms that may output information from the computing device 100. The mechanisms may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, volumetric display device, plotter, or some other mechanism. The output device 170 may be directed by, for example, the processing logic 120, to output the information from the computing device 100. The information may be presented (e.g., displayed, printed) by the output device 170. The information may include, for example, graphical user interface (GUI) elements (e.g., windows, widgets, etc.), a graphical representation of a model, text, or other information that is presented by the output device 170.

The communication interface 180 may include logic configured to interface the computing device 100 with, for example, a communication network and enable the computing device 100 to communicate with entities connected to the network. An example of a computer network that may be used with computing device 100 will be described further below with respect to FIG. 12.

The communication interface 180 may include a transceiver-like mechanism that enables the computing device 100 to communicate with the entities connected to the network. The communication interface 180 may be implemented as a built-in network adapter, network interface card (NIC), Personal Computer Memory Card International Association (PCMCIA) network card, card bus network adapter, wireless network adapter, Universal Serial Bus (USB) network adapter, modem or other device suitable for interfacing the computing device 100 to the network.

The primary storage 130 may comprise one or more tangible computer-readable media configured to store information for processing logic 120. The primary storage 130 may be accessible to the processing logic 120 via bus 190. The information may include computer-executable instructions and/or data that may be configured to implement operating system (OS) 132 and modeling environment (ME) 200. The instructions may be executed, interpreted, and/or otherwise processed by processing logic 120.

The primary storage 130 may comprise a RAM that may include RAM devices configured to store information (e.g., data, executable instructions). The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

OS 132 may be a conventional operating system that may be configured to implement various conventional operating system functions, such as (1) scheduling one or more portions of ME 200 to run on the processing logic 120, (2) managing the primary storage 130, and (3) controlling access to various components in the computing device 100 (e.g., input device 160, output device 170, network interface 180, secondary storage 150) and information received/transmitted by these components. Examples of operating systems that may be used include the Linux operating system, Microsoft Windows operating system, the Symbian operating system, and the Android operating system. A version of the Linux operating system that may be used is Red Hat Linux available from Red Hat Corporation, Raleigh, N.C. Versions of the Microsoft Windows operating system that may be used include Microsoft Windows Vista and Microsoft Windows XP operating systems available from Microsoft Inc., Redmond, Wash.

Figure 2:
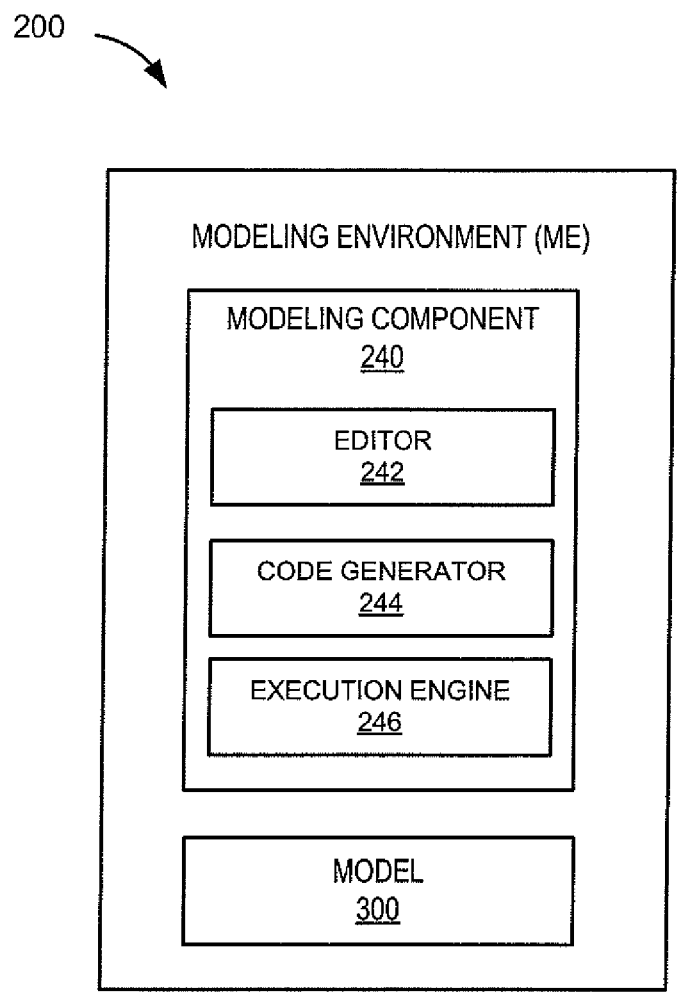
FIG. 2 illustrates an example of a modeling environment (ME) that may be configured to implement one or more embodiments of the invention.

ME 200 may be a modeling environment (e.g., a graphical modeling environment, textual modeling environment) that may be configured to implement one or more embodiments of the invention. Some or all of ME 200 may operate under the control of OS 132. FIG. 2 illustrates an example implementation of ME 200.

Referring to FIG. 2, ME 200 may comprise various components including, for example, modeling component 240 and model 300. ME 200 may be configured to, among other things, construct model 300, generate code and comments from model 300, compile and link the generated code, execute the compiled and linked code, and interpret model 300. The generated code may be generated, for example, in the MATLAB® language; ADA; C; C++; Java; hypertext markup language (HTML); extensible markup language (XML); a hardware description language (HDL), such as Very High Speed Integrated Circuits HDL (VHDL), Verilog, etc.; SystemC; an International Electrotechnical Commission (IEC) 61131-3 language, such as Structured Text, sequential function charts (SFC), etc.; a graphical language, such as class diagrams, object diagrams, state charts, activity diagrams, block diagrams, etc.; and so on, or some combination thereof. The generated code may be compliant with or at least partially compliant with certain standards, such as Autosar, a Motor Industry Software Reliability Association (MISRA) standard, an International Organization for Standardization (ISO) standard, etc.

The ME 200 may include hardware-based and/or software-based logic that may be configured to provide a computing environment that may allow, for example, a user to perform tasks related to disciplines, such as, but not limited to, mathematics, science, engineering, medicine, business, biology, finance, and so on. The ME 200 may include a dynamically-typed programming language (e.g., the MATLAB® language) that may be used to express problems and/or solutions in mathematical notations.

For example, the ME 200 may use an array as a basic element, where the array may not require dimensioning. These arrays may be used to support array-based programming where an operation may apply to an entire set of values included in the arrays. Array-based programming may allow array-based operations to be treated as a high-level programming technique that may allow, for example, operations to be performed on entire aggregations of data without having to resort to explicit loops of individual non-array operations.

In addition, the ME 200 may be configured to perform matrix and/or vector formulations that may be used for data analysis, data visualization, application development, simulation, modeling, and/or algorithm development. These matrix and/or vector formulations may be used in many areas, such as statistics, image processing, signal processing, control design, life sciences modeling, discrete event analysis and/or design, state-based analysis and/or design, and so on.

The ME 200 may further provide mathematical functions and/or graphical tools that may be used for creating plots, surfaces, images, volumetric representations, or other representations. The ME 200 may provide these functions and/or tools using toolboxes (e.g., toolboxes for signal processing, image processing, data plotting, and/or parallel processing). In addition, the ME 200 may provide these functions as block sets. The ME 200 may also provide these functions in other ways, such as via a library, local or remote database, and so on.

Examples of MEs that may be modified to incorporate one or more embodiments of the invention may include, but are not limited to, MATLAB®, Simulink®, Stateflow®, Simscape™, and SimEvents®, which are available from The MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL), etc.); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica or Dymola from Dynasim AB; VisSim from Visual Solutions; SoftWIRE from Measurement Computing Corporation; WiT from DALSA Coreco; VEE Pro and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody and Tau from International Business Machines (IBM), Inc.; SCADE from Esterel Technologies; CoWare from CoWare, Inc.; and Ptolemy from the University of California at Berkeley.

Model 300 may be, for example, a graphical model, an executable model, a time-based graphical block diagram model, a state transition diagram, a discrete event model, an activity diagram, a UML diagram, a sequence diagram, a data flow model, a statechart, a dataflow diagram, a sequential function chart, a class diagram, or some other type of model or diagram. Model 300 may be configured to represent a system, such as a physical system. Model 300 may be graphical, textual, or some combination of graphical and textual. The system represented by model 300 may be dynamic, linear, non-linear, or some other type of system.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems. Examples of man-made or engineered dynamic systems may include, for example, a bouncing ball, a spring with a mass tied on an end, automobiles, airplanes, control systems in major appliances, communication networks, audio signal processing, nuclear reactors, and a stock market.

The system represented by model 300 may have various execution semantics that may be represented in model 300 as a collection of modeling elements, often referred to as blocks. A block may generally refer to a portion of functionality that may be used in the model 300. The block may be graphically represented, however, it can be appreciated that the block does not necessarily need to be represented graphically. For example, the block may be represented textually or stored in some form of internal representation. Also, a particular visual depiction used to represent the block, for example in a graphical block diagram, may be an arbitrary choice.

A block may be hierarchical in that the block itself may comprise one or more blocks that make up the block. A block comprising one or more blocks (sub-blocks) may be referred to as a subsystem block. A subsystem block may be configured to represent a subsystem of the overall system represented by the model.

Modeling component 240 may contain computer-executable instructions and data that are configured to perform various tasks. These tasks may include (1) constructing model 300, for example, through a GUI; (2) allowing an augmentation of a pre-defined set of blocks with custom user-specified blocks that may be associated with model 300; (3) using model 300 to compute and trace a temporal evolution of outputs associated with a dynamic system represented by the model 300; (4) automatically producing, for example, deployable software systems, and descriptions of hardware systems that mimic a behavior of either the entire model 300 or portions of model 300; and (5) generating code and comments for model 300. The blocks may be represented in a graphical representation (e.g., a block diagram) of the model 300 that may be presented by the ME 200 to a user via output device 170.

The modeling component 240 may include an editor 242, code generator 244, and execution engine 246. The editor 242 may be configured to allow a user to specify, edit, annotate, save, publish, and print a block diagram of model 300. Moreover, as will be described further below, the editor may be configured to display code and comments generated by ME 200.

The code generator 244 may be configured to generate code (e.g., source code) based on the model 300. As will be described further below, the generated code may include comments that may be generated in whole or in part using information (e.g., rules) that may be dynamically specified. For example, as will be described further below, the information may be specified by a user so as to configure the comment generation.

The execution engine 246 may be configured to compile and link the generated code to produce an "in-memory executable" version of model 300. The in-memory executable version of model 300 may be used, for example, to simulate, verify, trim, or linearize the model 300. It should be noted that execution engine 246 may be configured to interpret the generated code in order to, for example, simulate, verify, trim, or linearize the model 300.

Figure 3:
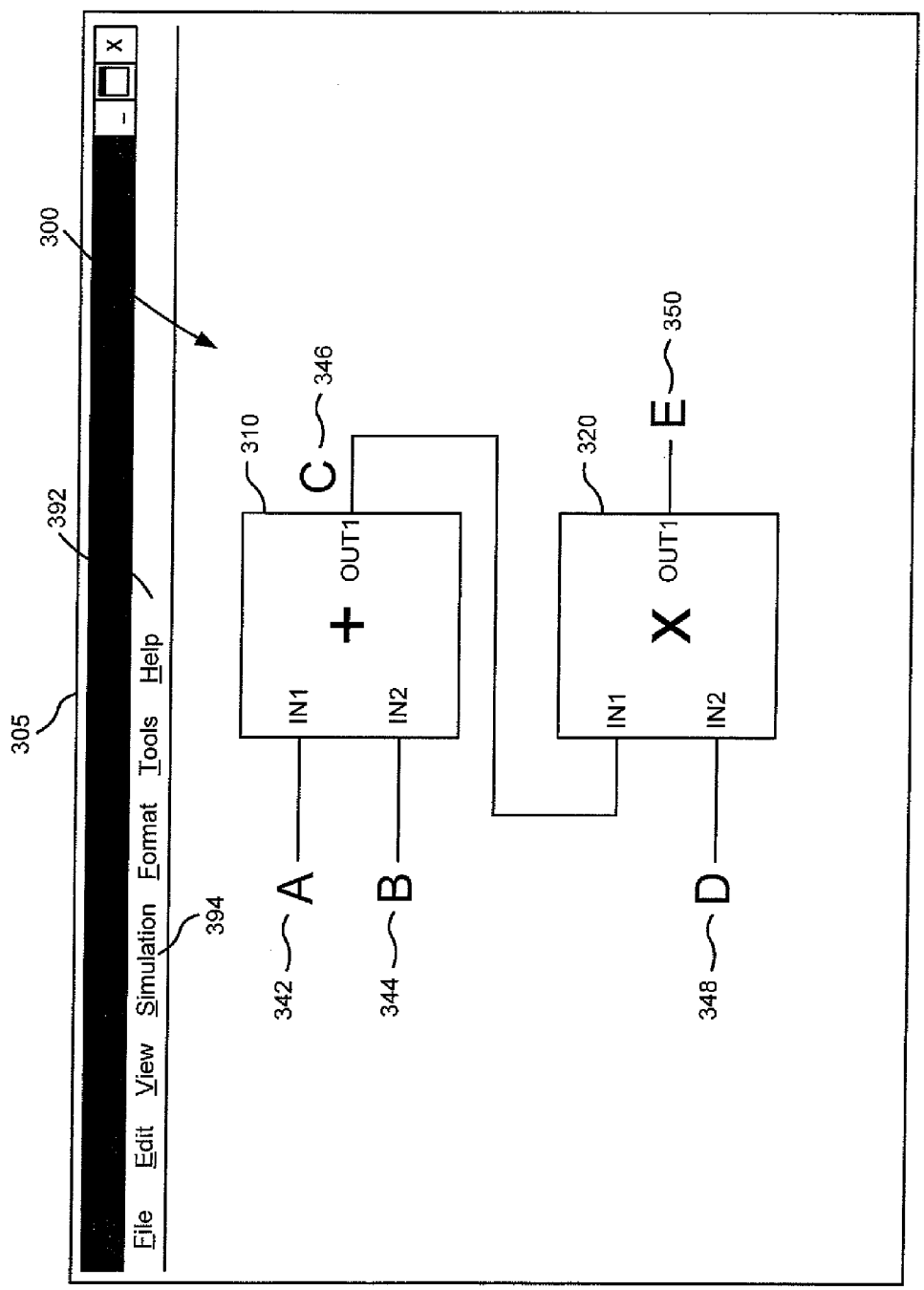
FIG. 3 illustrates an example block diagram of a model from which code containing comments may be generated.

FIG. 3 illustrates an example block diagram of an embodiment of model 300. Referring to FIG. 3, a user may interact with model 300 through a graphical window 305 that may be provided by ME 200. Graphical window 305 may provide an interface through which commands relating to model 300 may be entered. For example, graphical window 305 may include a menu bar 392 that may allow the user to select various menus. A menu may contain one or more menu items that when selected may perform various functions. For example, menu bar 392 contains a "simulation" menu 394 that may include a menu item (not shown) that when selected may start a simulation of model 300. It should be noted that other techniques may be used to perform functions related to model 300. For example, a command line interface may be provided in a separate window (not shown) that enables commands relating to the model 300 to be entered. The commands when entered may perform various functions associated with the model 300.

Model 300 includes an addition block 310 and a multiply block 320. The addition block 310 may be configured to add signals that are input into the block 320 at its input port (inport) "IN1" and inport "IN2" inputs. A result of adding the signals may be output at output port (outport) "OUT1". In this example, a signal "A" 342 is input into block 310 at inport "IN1" and a signal "B" 344 is input into block 310 at inport "IN2" and a signal "C" 346, which represents the result of adding signals "A" 342 and "B" 344, is output from block 310 at outport "OUT1".

Likewise, multiply block 320 has two inports "IN1" and "IN2" and one outport "OUT1". Signals at inports "IN1" and "IN2" are multiplied to produce a result that is output from block 320 at outport "OUT1". In this example, signal "C" 346 is input into block 320 at inport IN1 and a signal "D" 348 is input into block 320 at inport "IN2". A result is generated by multiplying these two signals. The result is output from block 320 via outport "OUT1" as signal "E" 350. As will be described further below, properties associated with signals "A" 342, "B" 344, "C" 346, "D" 348, and "E" 350 may be included in data objects in a workspace that may be maintained by ME 200 for model 300. Note, though, that the properties may be directly associated with the signals in the model.

Code generator 244 may analyze model 300 and generate an intermediate representation (IR), such as a code generation intermediate representation (CGIR), that it may use to generate code and comments from the model 300. The comments may or may not be incorporated into the generated code. Likewise, the generated code may or may not be incorporated into the comments. In addition, the code may be represented as pseudo-code that may be included with the comments. Moreover, it should be noted that the comments may be generated without generating the code.

An entity, such as a signal, associated with a model may be associated with various properties that may be maintained in one or more data objects. The data objects may be contained in a workspace that is maintained by ME 200.

Figure 4:
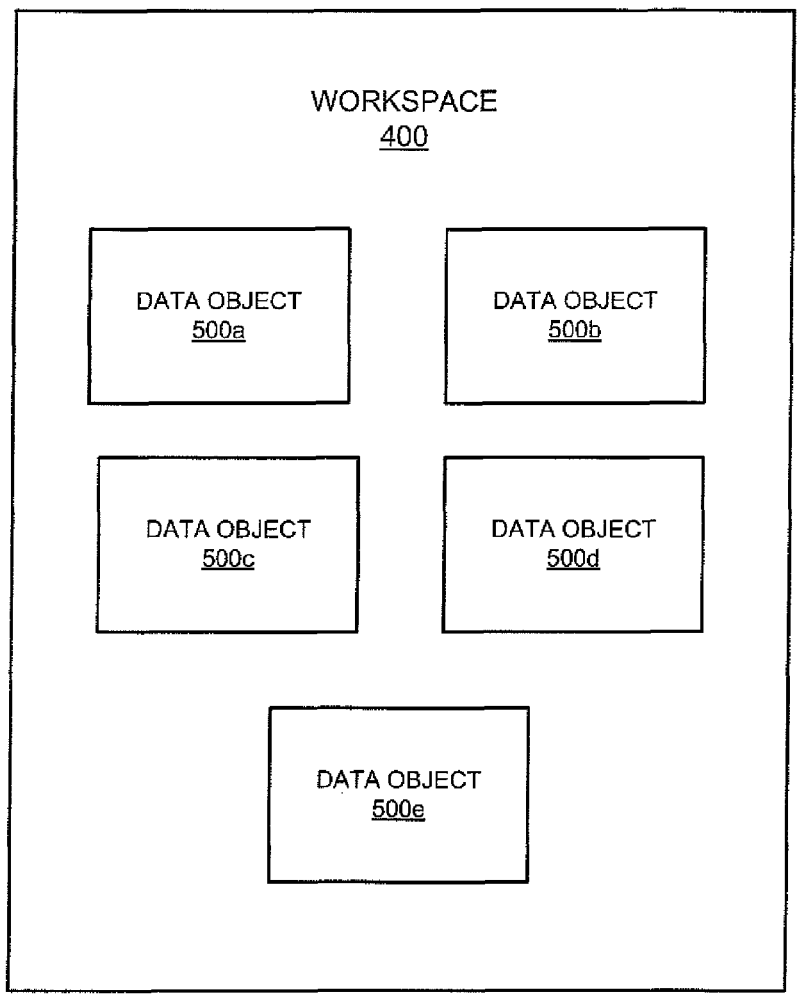
FIG. 4 illustrates an example workspace containing data objects that may be generated from a model.

FIG. 4 illustrates an example workspace 400 containing data objects 500a-e that may be maintained by ME 200. Referring to FIG. 4, data objects 500a, 500b, 500c, 500d, and 500e may be used to hold properties associated with signals "A" 342, "B" 344, "C" 346, "D" 348, and "E" 350, respectively. Note that in computing device 100, the workspace 400 may be contained in, for example, primary storage 130 and/or secondary storage 150.

Figure 5:
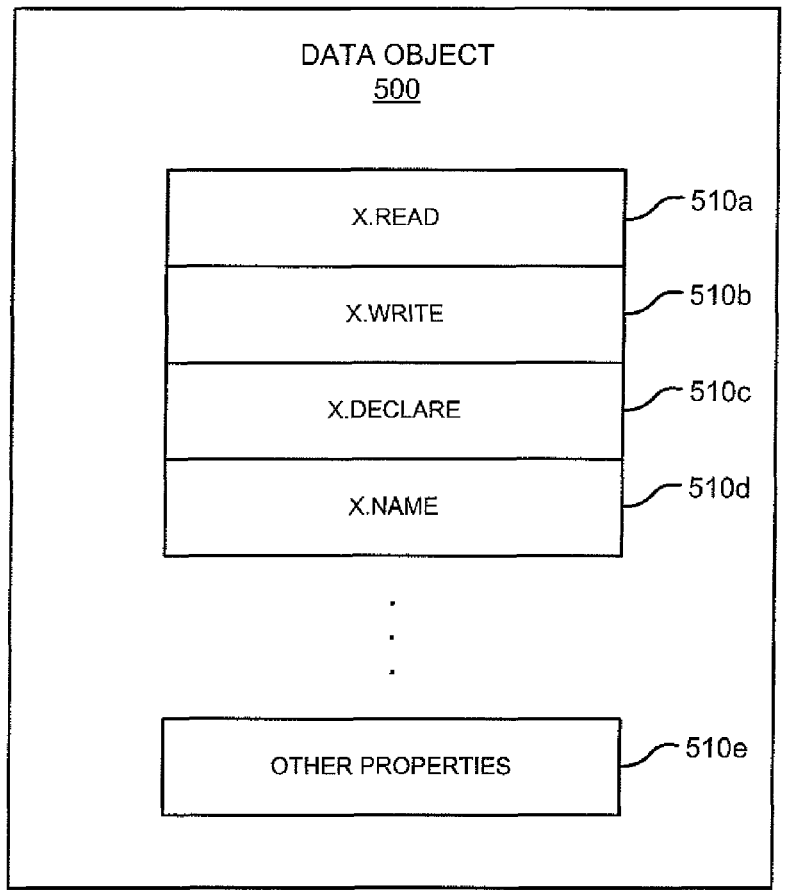
FIG. 5 illustrates properties that may be associated with a data object.

FIG. 5 illustrates example properties 510 that may be contained in a data object 500. A property 510 may be used to specify an attribute for an entity that is associated with the data object 500. For example, referring to FIG. 5, property 510d may specify a name associated with the entity. Other attributes associated with the entity may be specified in other properties 510e. These attributes may include, for example, units, data type, whether the entity is local or global, a category, or other attributes.

A property 510 may be used to specify information (e.g. a rule, text, a template, a query, a pointer to a script, a command, a remote call) that may be used to generate, for example, a comment for an entity associated with the data object 500. The comment may be included in code that is generated for a model. The comment may be generated based on a structural usage of the entity in the code. The entity may be a variable and a structural usage of the entity in code may be, for example, writing, reading, or referencing the variable in the code.

For example, suppose, data object 500a is associated with a variable named "T1", which holds a value of signal "A" 342. Data object 500a may contain a property 510a that may be used to specify information for generating a comment for code that reads "T1". Likewise, data object 500a may contain property 510b that may be used to specify information for generating a comment for code that writes "T1".

Note that data object 500a may contain other properties used to generate comments for code associated with a variable. For example, data object 500a may contain property 510c that may be used to specify information for generating a comment for code that declares "T1".

As noted above, information associated with generating a comment for code for a model may be included in a property that is associated with a data object. In other embodiments, information associated with generating a comment may be contained elsewhere. In still other embodiments, information may be associated with a data object and contained elsewhere.

Figure 6:
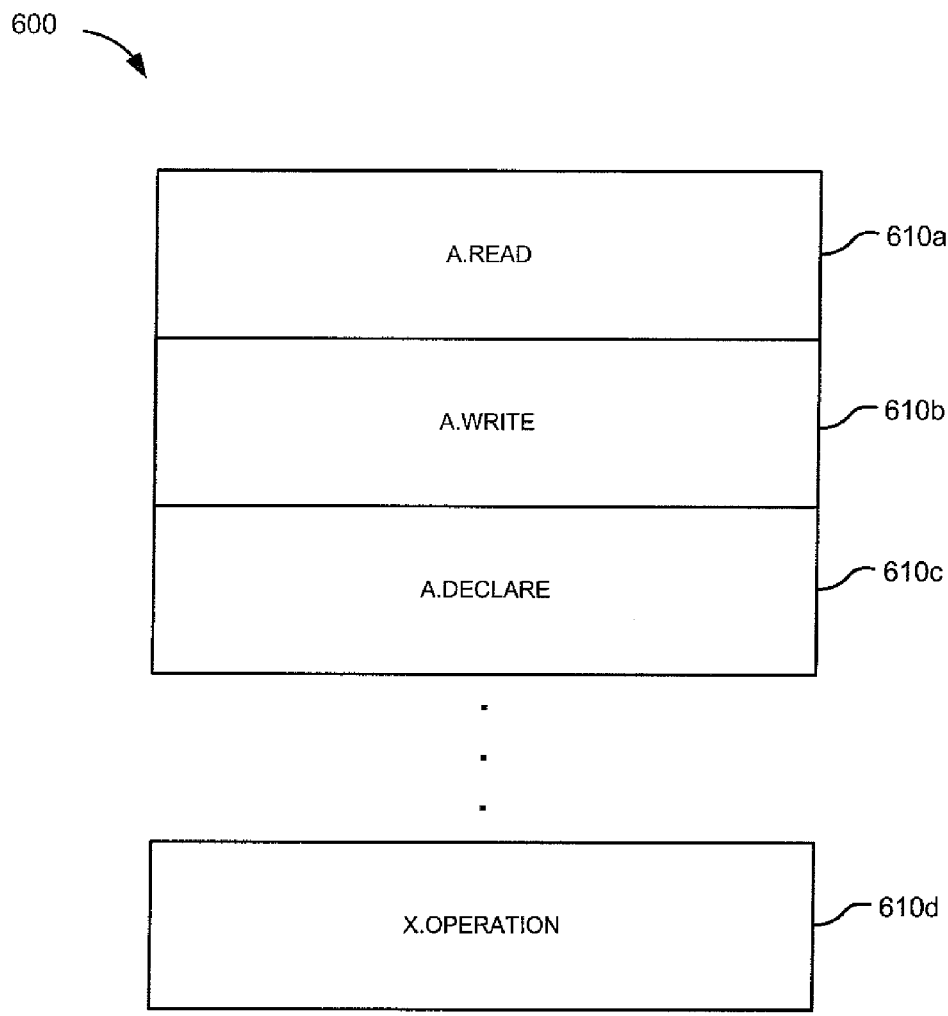
FIG. 6 illustrates a data structure containing information that may be used to generate comments for code generated for a model.

FIG. 6 illustrates a data structure 600 that may be configured to hold information that may be used to generate comments for code that is generated for a model, such as model 300. Referring to FIG. 6, the data structure 600 may be organized as a table having one or more entries 610. An entry 610 may contain information that may be used to generate a comment for an entity associated with a model. For example, the entity may be a variable and entry 610a may contain information associated with generating a comment for code that reads the variable. The information may be text, a template, a rule, a query, a pointer to a script, a command, a remote call, or other information that may be used to generate the comment. Likewise, entries 610b and 610c may contain information that may be used to generate a comment when the variable is written or declared, respectively, in the code. Still other operations associated with other entities may be included in other entries 610d in the data structure 600. Note that other types of data structures, such as a file, tree, database, or other structure, may be used to hold information for use in generating comments for code for a model.

Figure 7:
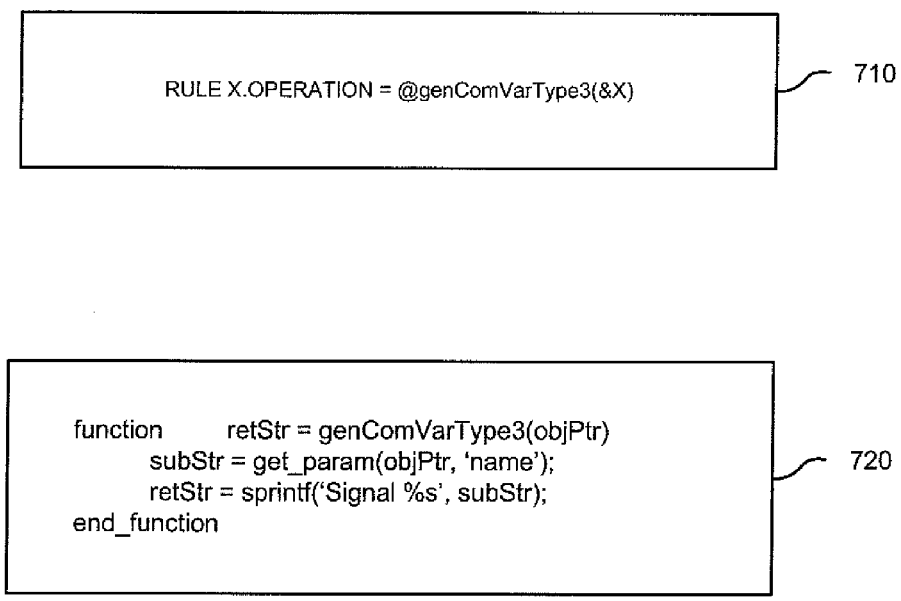
FIG. 7 illustrates an example of information that may be used to generate a comment.

FIG. 7 illustrates an example of information 710 and a script 720 that may be used to generate a portion of a comment. The information 710 may be contained in an entry 610 or a property 510. The information 710 may include a rule which may be configured to invoke the script 720.

Script 720 contains a function named "genComVarType3". The function may be called with a pointer to a data object, such as data object 500. The function is configured to acquire (get) a name associated with an entity and generate a string that includes the text "Signal" followed by the acquired name. The function returns a pointer to the generated string. The generated string may be used in a comment.

Figure 8A:
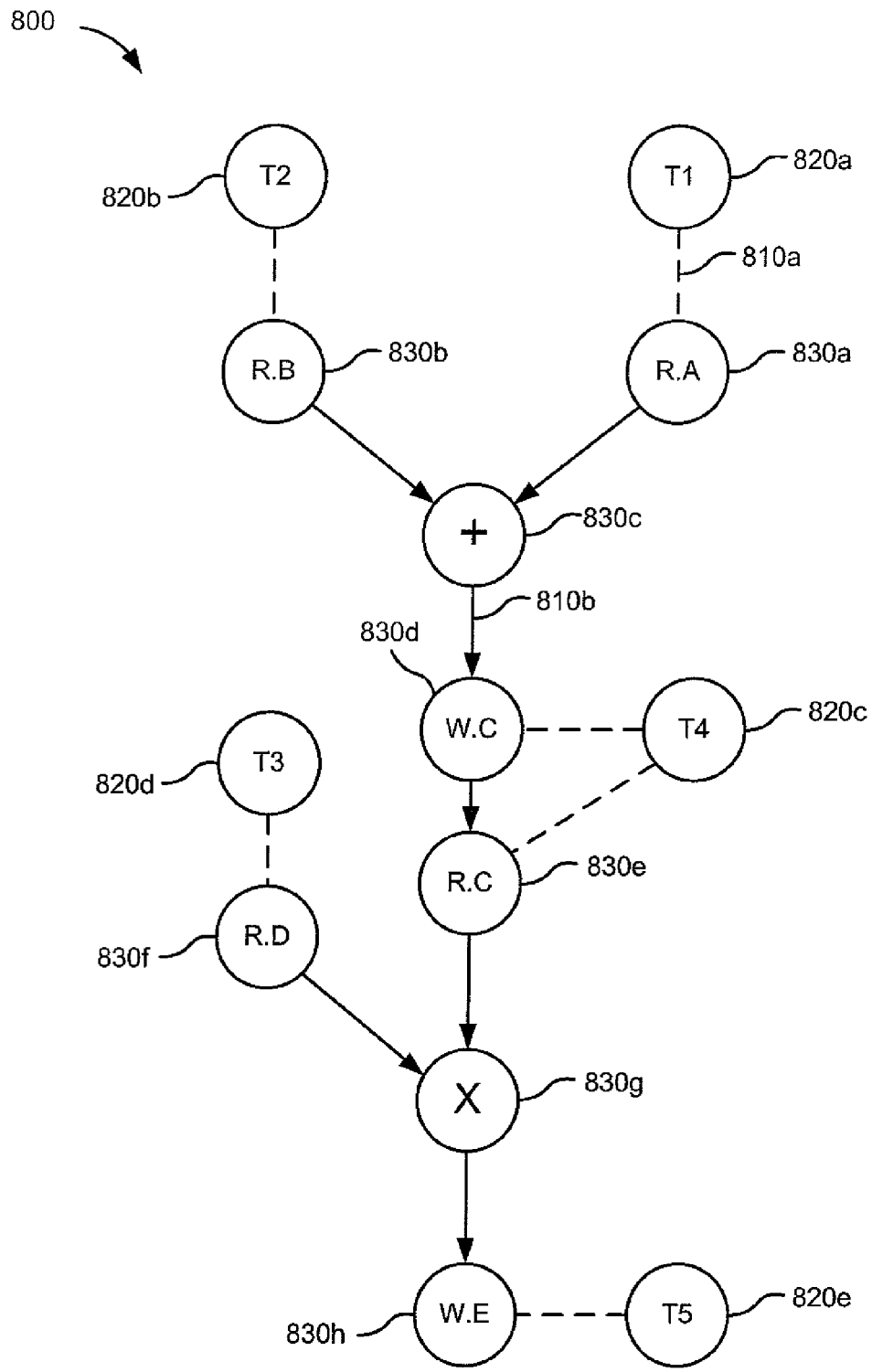
FIGS. 8A-D illustrate examples of intermediate representations (IRs) that may be generated from a model.
Figure 8B:
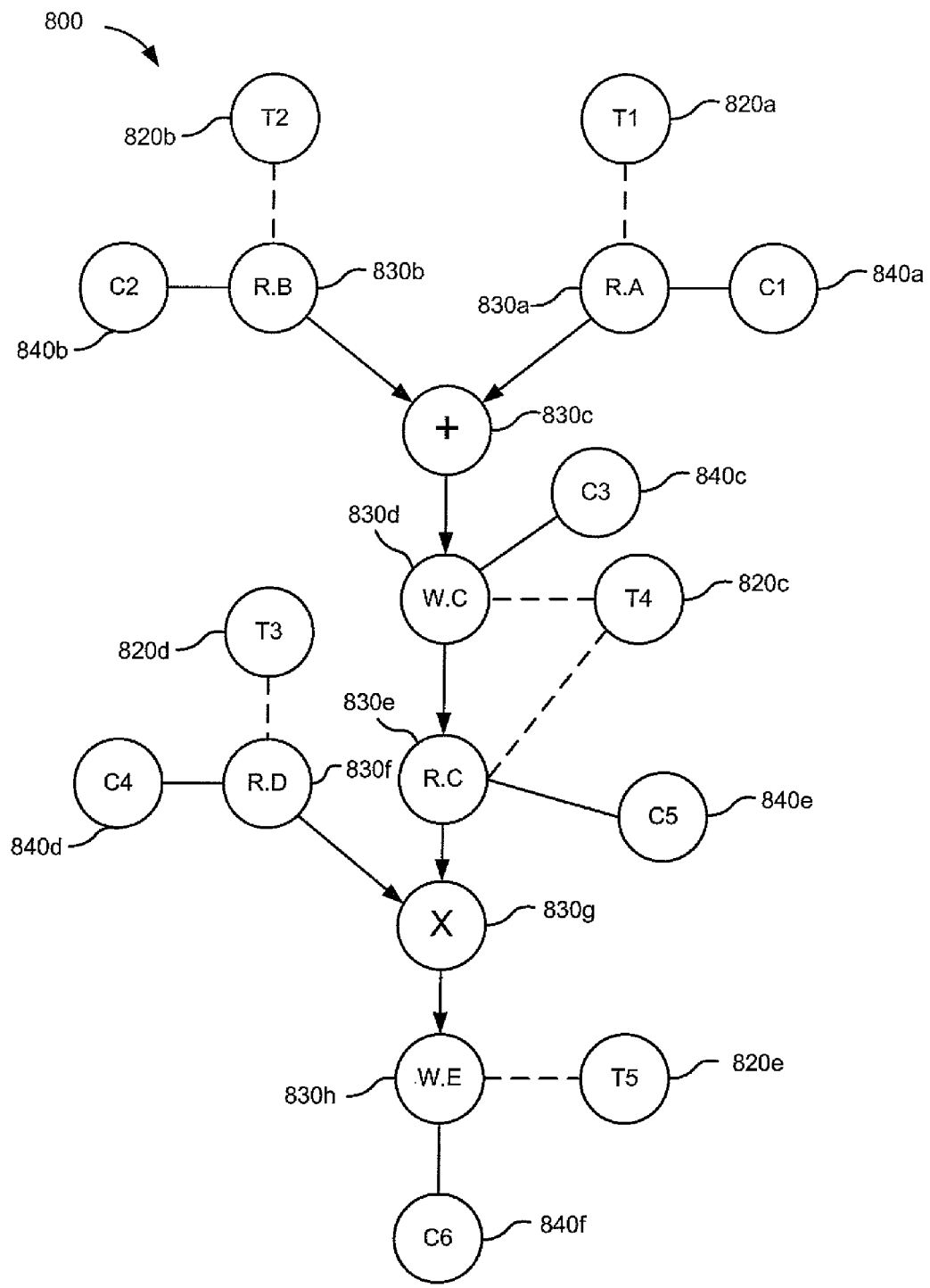
Figure 8C:
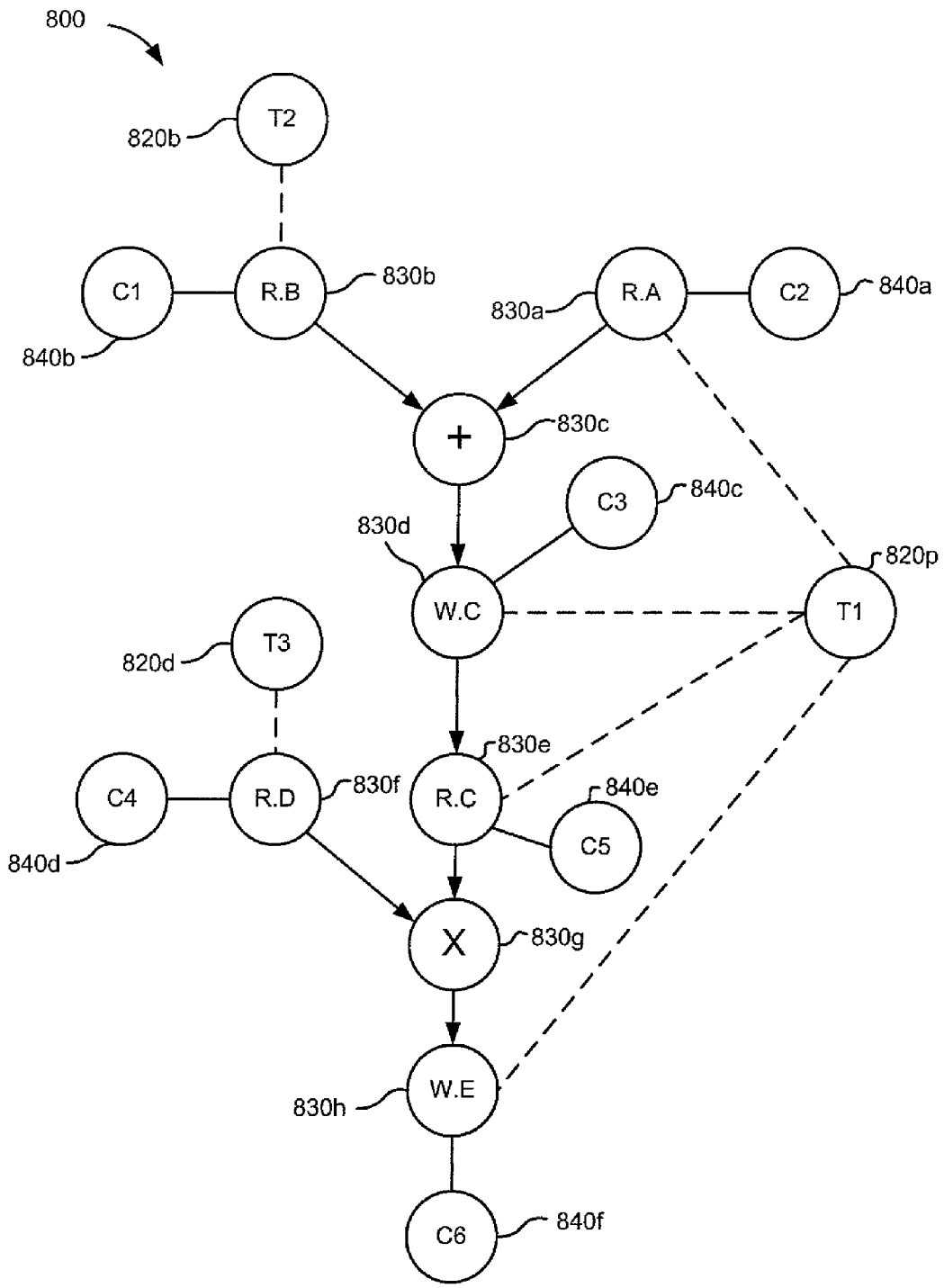

As noted above, code generator 244 may analyze model 300 and generate an IR. From this IR code generator 244 may generate code and comments for the code. FIGS. 8A-C illustrate examples of intermediate representations (IRs) that may be generated from model 300, by code generator 244.

Referring to FIG. 8A, IR 800 may contain one or more nodes and one or more lines. The nodes may include entity nodes 820 and operation nodes 830. An operation node 830 may represent an operation (e.g., read, write, add, multiply, etc.). An entity node 820 may be used to represent an entity (e.g., a signal, variable, block, etc.). The entity may be used (e.g., manipulated) by an operation represented by an operation node 830. The operation may include, for example, read or write behavior.

For example, entity node 820a may be used to represent a variable "T1", which may hold a value for signal "A" 342 (FIG. 3) in model 300. Operation node 830a may be used to represent an operation that may involve "reading a value of signal A from T1" (R.A).

Dashed lines may indicate a linkage relationship between an entity node 820 and an operation node 830. For example, dashed line 810a may be used to indicate a linkage relationship between variable node 820a and operation node 830a.

A solid line may be used to indicate a flow relationship between nodes. For example, solid line 810b may be used to indicate a flow relationship between operation node 830c that may represent an operation involving "adding a value of signal B to a value of signal A to produce a value of signal C" and operation node 830d that may represent an operation that may involve "storing the value of signal C in T4".

A flow relationship may denote an order in which various operations may be performed. Thus, in the above example, the arrow in line 810b indicates that the add operation, represented by node 830c, may be performed prior to the write operation W. C, represented by node 830d.

Certain nodes in IR 800 may be classified as sites where an operation, such as a read or write, occurs. For example, at nodes 830a, 830b, and 830f, read operations occur. These nodes 830a, 830b, and 830f, may be referred to as "read sites". Likewise, at nodes 830d and 830h, write operations occur. These nodes 830d and 830h, may be referred to as "write sites".

Comment nodes may be added to the IR 800 at the various sites. A comment node may represent one or more comments that may be associated with a structural usage of an entity at a site. FIG. 8B illustrates IR 800 with comment nodes 840a-f.

Referring to FIG. 8B, a comment node 840 may be associated with a particular site. For example, comment node 840a is associated with read site 830a. Likewise, for example, comment node 840b is associated with read site 830b, comment node 840c is associated with write site 830d, comment node 840d is associated with read site 830f, and comment node 840f is associated with write site 830h. A comment node 840 may represent a comment by including the comment, including a reference (e.g., a pointer) to the comment, etc. in the node 840.

For example, suppose that data object 500a holds properties for signal "A" 342. Further suppose that read property 510a includes rule 710, which may be used to generate a portion of the comment when signal "A" 342 is read at a particular read site in IR 800. Generating a comment for read site 830a may include accessing the read property 510a in the data object 500a and applying rule 710. Applying the rule 710 may include executing script 720 to gather information (e.g., a name associated with entity "A" 342) for the comment. After the comment is generated, ME 200 may generate comment node 840a and include the generated comment in the node 840a, by, for example, placing the comment in the node, placing a pointer to the comment in the node, etc.

It should be noted that other information may be included in a comment node 840. For example, a comment node 840 may include a pointer to a rule used to generate a comment, a pointer to a property used to generate a comment, etc.

ME 200 may perform one or more optimizations on IR 800 prior to generating code for a model. One of these optimizations may include buffer reuse. Buffer reuse typically involves reusing a buffer (storage) when the original information in the buffer is no longer needed. For example, the code "T1=T1+T2" includes buffer reuse. Here, the variable "T1" is initially used to hold a value of an addend. "T1" is later reused to hold a result, since after the calculation "T1+T2" is performed the value of the addend may no longer be needed.

FIG. 8C illustrates an example of buffer reuse optimization that may be applied to IR 800. Referring to FIG. 8C, note that the variables "T4" and "T5" have been removed and in their place "T1" is used. Specifically, variable "T1" initially holds a value that is added to the value in "T2" at operation node 830c. The result (sum) is stored in "T1", since the initial value of "T1" is no longer needed after the addition operation. This enables "T1" to be reused. Likewise, the value of "T1" is multiplied by the value of "T3" at operation node 830g and the result (product) is stored in "T1", since the previous value of "T1" is no longer needed after the multiplication operation.

Note in FIG. 8C that comment nodes 840a-f have remained in place even though the above optimization has been applied to IR 800. Thus, comments, associated with a particular site, are preserved even though variables (e.g., temporary variables) associated with the site may have changed because of optimization.

Referring to FIG. 8C, "T1", "T2", and "T3" are initially set to the values of signal "A" 342, signal "B" 344, and signal "D" 348, respectively. "T1" is read at node 830a and "T2" is read at node 830b. "T1" and "T2" are added at node 830c to produce a sum. The sum is written to "T1" at node 830d. At node 830e, "T1" (which now contains the sum) is read and, at node 830f, "T3" is read. At node 830g, "T1" and "T3" are multiplied to produce a product, which is written to "T1" at node 830h.

Figure 8D:
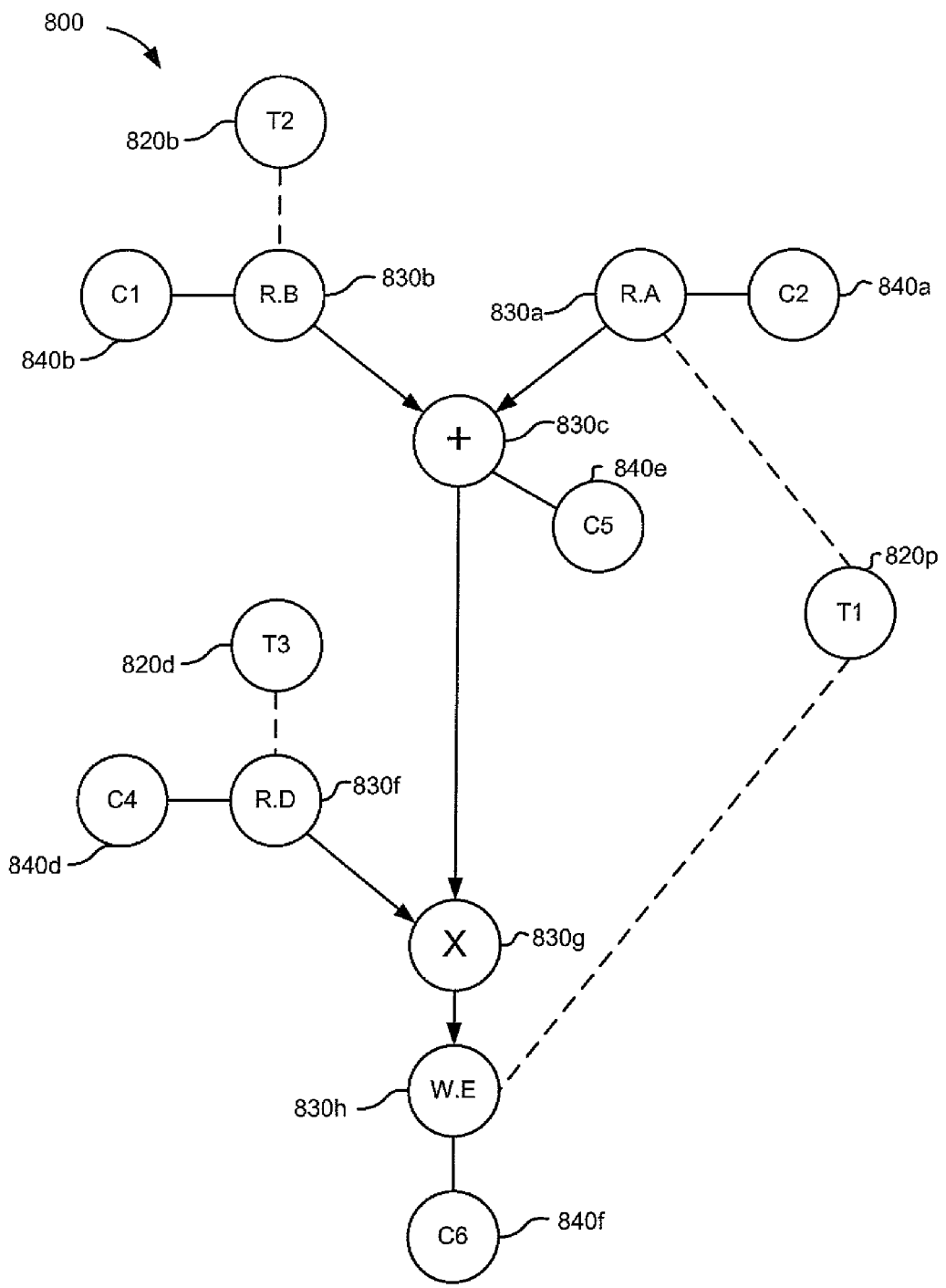

FIG. 8D illustrates an example of an expression folding optimization that may be applied to the IR 800 illustrated in FIG. 8C. Referring to FIG. 8D, note that operation nodes 830d and 830e have been removed. In addition, comment node 840c has been removed and comment node 840e has been moved to node 830c. Due to expression folding, the signal "C" 346 may be represented by the equation "T1+T2", thus, operation nodes 830d-e no longer become necessary (and may be removed) and comment node 830c may be moved to operation node 830c.

Comments that are generated for entities may be output with code that is generated for the model. The generated comments may be output by an output device, such as output device 170, stored in storage, such as primary storage 130 or secondary storage 150, or otherwise outputted. The comments may appear, for example, before the generated code, after the generated code, and/or in-line with the generated code. FIG. 9 illustrates example listings of code that includes comments that may be generated for a model, such as model 300.

Referring to FIG. 9, listing 920 illustrates an example listing where comments are included "in line" with the generated code. The comments are delineated by the text "/*" and "*/". One or more portions of the comments may be generated by information that may invoke a script to generate the one or more portions of the comment. For example, the text "Signal C" in the comment "/* Signal C */" may be generated by information 710 which invokes script 720 to generate the text "Signal C".

The listing 920 may be generated from an IR, such as IR 800. For example, referring to FIG. 8C, nodes in the IR 800 may be visited in a certain order to generate the code and corresponding comments in listing 920.

Listing 930 illustrates an example listing where the generated comments precede code associated with the comments. As noted above, the comments are delineated by the text "/*"

and "*/". Portions of the comments may be generated using information, such as information 710. For example, a portion of the text "T1 read is Signal A" may be generated using information 710, which may execute script 720 to generate the text "Signal A".

Listing 940 illustrates an example listing of comments that may be generated for a declaration or definition of a multiple use variable. For example, in the IR 800 illustrated in FIG. 8C, variable "T1" is used for signal "A" 342, signal "C" 346, and signal E 350. Listing 940 indicates this multiple usage of variable "T1" in the comment "Usage of T1 are Signal A, Signal C, and Signal E". This comment may be generated by traversing (crossing) the IR 800, identifying sites that variable "T1" is associated with, and generating the comment based on the signals associated with the identified sites. For example, in traversing the IR 800 illustrated in FIG. 8C, it may be determined that variable "T1" is associated with sites 830a, 830d, 830e, and 830h. From these sites it may be further determined that "T1" is associated with signal "A" 342, signal "C" 346, and signal "E" 350. The comment in listing 940 may be generated knowing which signals are associated with "T1".

The ME 200 may provide an option to enable/disable comments for certain sites in the IR. For example, the ME 200 may contain provisions that allow a user to specify that only comments associated with write sites are included in a listing. Here, when generating the listing, the ME 200 may skip over comment nodes that are associated with sites other than write sites.

Listing 950 illustrates an example of comments that may be generated for model 300 after an expression folding optimization has been applied to IR 800 as illustrated in FIG. 8D. Note that the folding optimization folds the expression "T1=T1+T2" into the expression "T1=T1*T3" to generate the expression "T1=(T1+T2)* T3". The nested expression "(T1+T2)" represents signal "C" 346. This is indicated in the comment "Expression (T1+T2) is Signal C".

Figure 10:
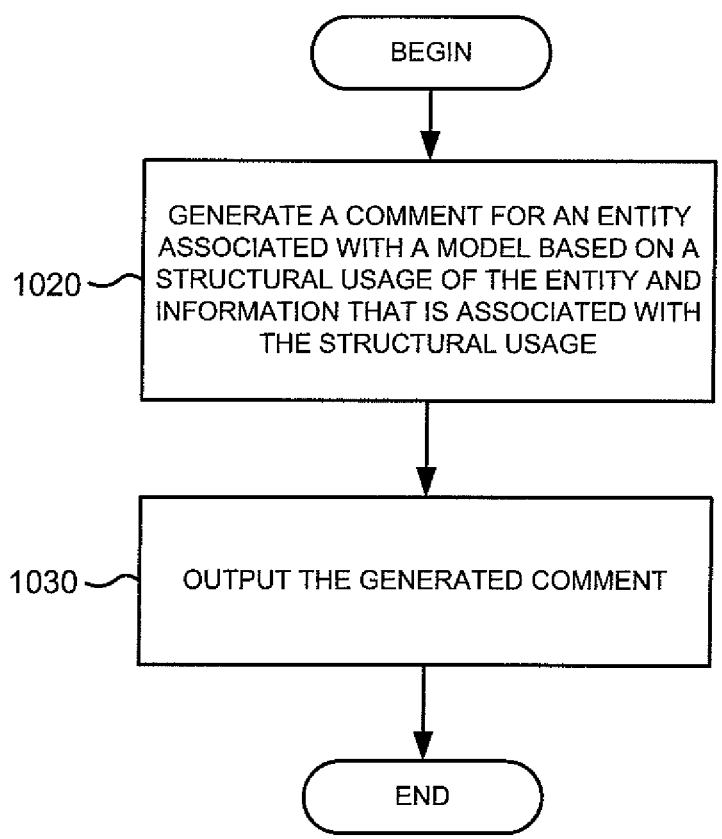
FIG. 10 illustrates a flowchart of example acts that may be used to generate a comment for an entity in a model.

FIG. 10 illustrates a flowchart of example acts that may be used to generate a comment for an entity associated with a model, such as model 300, based on a structural usage of the entity and information that is associated with the structural usage. Referring to FIG. 10, at block 1020, a comment is generated for an entity based on a structural usage of the entity associated with the model and information that is associated with the structural usage.

As noted above, an entity may be a parameter, state, block, signal, a variable, or some other entity that may be associated with a model. A structural usage of the entity associated with the model may include an operation, associated with the model that involves the entity. For example, a structural usage of an entity associated with the model may include reading the entity, writing the entity, reading a reference (e.g., a pointer) to the entity, writing a reference to the entity, or some other structural usage in code generated for the model. The structural usage may coincide with, for example, read sites and/or write sites in an IR generated from the model. Information associated with a structural usage of an entity may include text, a script, a rule, or other information that is associated with the structural usage of the entity.

At block 1030, the generated comment is output. A comment may be output, for example, by an output device, such as output device 170, stored in storage, such as primary storage 130 or secondary storage 160, or otherwise outputted. The comment may be output as part of the code, in a listing of the code, or other output. For example, one or more generated comments may be displayed by an editor, such as editor 242. The generated comments may be displayed on output device 170 with or without generated the code. For example, a user may position a pointing device to hover a cursor over code to select certain generated code. Comments associated with the selected code may be displayed in a separate window. Note that the comments may be stored in a different layer in, for example, a text document. Moreover, the comments may also be stored in meta tags.

Figure 11A:
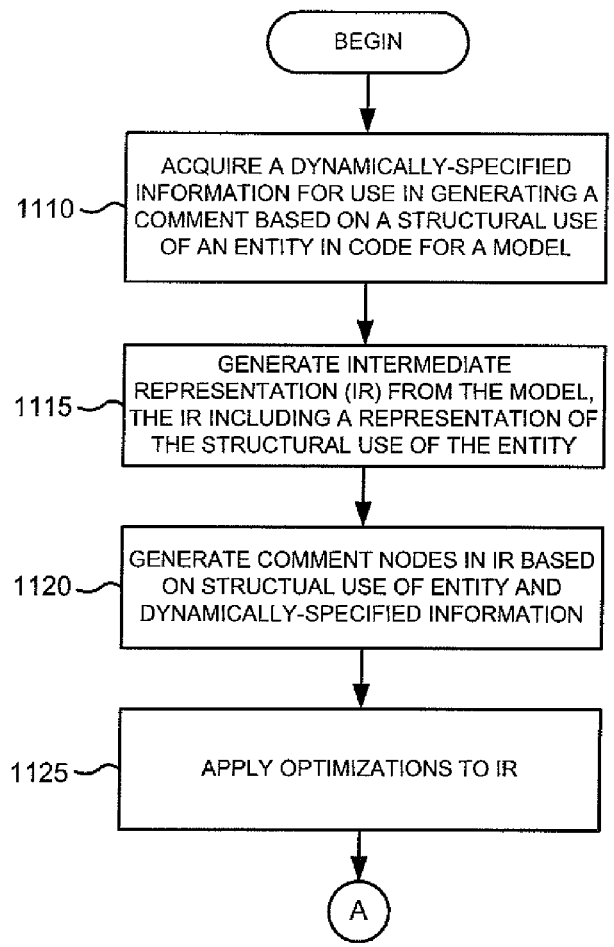
FIGS. 11A-B illustrate a flowchart of example acts that may be used to acquire dynamically-specified information and generate a comment for an entity in a model based on the dynamically-specified information.
Figure 11B:
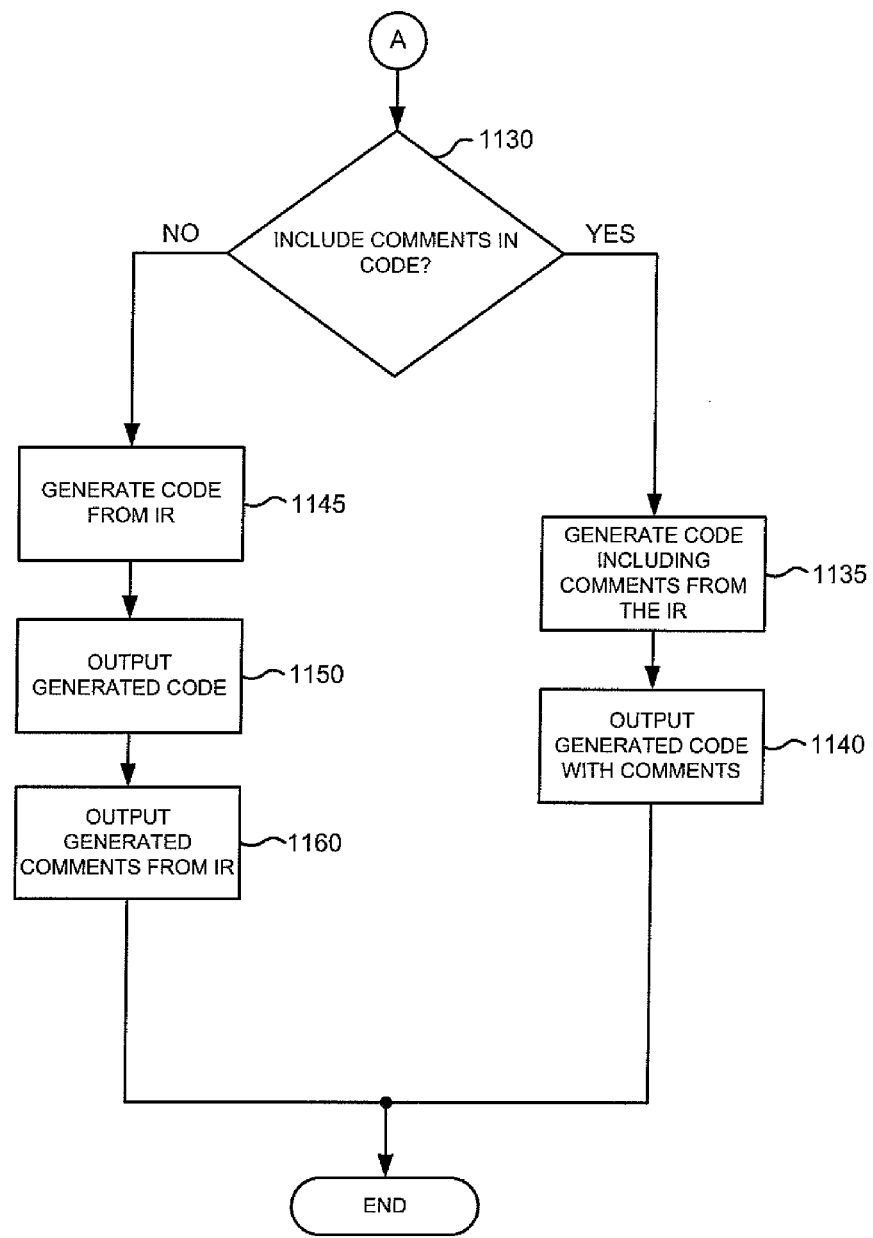

FIGS. 11A-B illustrate a flowchart of example acts that may be used to acquire dynamically-specified information, generate one or more comments for an entity in a model based on the dynamically-specified information and a structural usage of the entity, generate code that includes the generated comments, and output the generated code and included comments.

Referring to FIG. 11A, at block 1110, the dynamically-specified information is acquired. The information may be for use in generating a comment based on the structural use of the entity associated with the model. For example, the information may include one or more rules that may be used to generate a comment, such as described above. The rules may use one or more tokens that may be used to represent one or more attributes of the model, one or more attributes of entities associated with the model, etc. (e.g., attribute name, root model name, system hierarchy level, data type acronym, entity identifier, etc.) that may be included in the comment. For example, '$n' could represent a token that may cause a name of a variable to be inserted in a comment, '$s' could represent a token that may cause a name of a signal to be inserted in a comment, '$h' could represent a token that may cause a system hierarchy level to be inserted in a comment, etc.

The information may be acquired by reading the information from a user interface, a network interface, a data structure, a repository, a file, a database, etc. The entity may be a parameter, state, block, signal, variable, or some other entity associated with the model. The structural usage of the entity may include an operation that involves, for example, reading the entity, writing the entity, etc.

Dynamically-specified information may relate to information that may be specified and/or selected dynamically. For example, in ME 200, a dynamically-specified rule may be a rule that may be specified dynamically as opposed to be fixed or hard-coded in the ME 200. Here, the dynamically-specified rule may be specified, for example, by a user using an editor. Note that control over the specification of the dynamically-specified rule is outside of the ME's control. Likewise, for example, in ME 200, a dynamically-specified rule may be a rule that may be selected dynamically as opposed to a rule that provides no control for selection. Here, the ME 200 may provide a list of rules that may be selected by a user. These rules may be considered dynamically-specified as control of the selection of the rules are outside the ME's control.

The dynamically-specified information may be specified using a GUI, a command line interface, or some other interface, which may be provided by the ME 200. The dynamically-specified information may be written to a file and the information may be acquired by the ME 200 by reading the file. Moreover, the information may be written and read from, for example, a repository or database. In addition, the information may be retrieved from a remote and/or network location. Note that other techniques may be used to acquire dynamically-specified information.

At block 1115, an IR, such as IR 800, is generated from the model. The IR may include a representation of the structural use of the entity. For example, the IR may contain entity nodes and operation nodes that may be used to represent a structural use of the entity in code that may be generated from the model.

At block 1120, comment nodes are generated for the IR based on the structural use of the entity and the dynamically-specified information. Generating the comment nodes may include generating comments and associating the comments with the comment nodes.

For example, a value associated with a signal in the model may be read from a variable. This read operation may be represented by an operation node in the IR. A comment node may be generated and associated with the operation node. Generating the comment node may include generating a comment, such as described above, that is included in the comment node.

At block 1125, optimizations are applied to the IR. The optimizations may include, for example, buffer reuse, such as described above.

At block 1130 (FIG. 11B), a check is performed to determine if the generated comments should be included in code that is generated from the IR. If so, at block 1135, code including the generated comments is generated from the IR. The code including the generated comments may be generated by visiting nodes in the IR, generating the code, and including the comments, accordingly. At block 1140, the generated code with the incorporated comments is output. Outputting may include displaying the generated code and comments, storing the generated code and comments, printing the generated code and comments, or some other form of outputting.

If at block 1130, the comments are not to be included in the code, at block 1145, the code is generated from the IR. As noted above, the code may be generated by visiting nodes in the IR and generating the code from the visited nodes. At block 1150, the generated code is output. The code may be output by displaying the code, storing the code, etc. At block 1160, generated comments are output. The generated comments may be output by visiting comment nodes in the IR and outputting the comments associated with the nodes. The outputted generated comments may be presented in a listing, GUI (e.g., window), etc. that is separate from the code. As noted above, comments may be generated without generating code. Here, the comments may be generated by traversing (crossing) the IR, generating the comments from the comment nodes, and not generating associated code. The generated comments may be presented in a listing that is, for example, displayed in a GUI window, output to a command line interface, output to a hardcopy device (e.g., a printer), stored in a file, etc.

For example, referring to FIGS. 1, 3, 7, 8A-C, 9, and 11A-B, suppose that code is to be generated with in-line comments, as illustrated in listing 920, for the embodiment of model 300 illustrated in FIG. 3. Further suppose that rule 710 is dynamically specified by a user and that the rule 710 is appropriately included as properties 610 in objects 600a-e for generating comments for reading and writing signals "A" 342, "B" 344, "C", 346, "D" 348, and "E" 350.

ME 200 may acquire the dynamically specified rules 710 (block 1110), by reading the rules from properties 610 in the data objects 600a-e. ME 200 may generate IR 800 (FIG. 8A) from the embodiment of model 300 illustrated in FIG. 3 (block 1115). The IR 800 may include sites, as described above that are associated with structural uses of signals "A" 342, "B" 344, "C", 346, "D" 348, and "E" 350. For example, site 830a may be associated with a read of signal "A" 342.

ME 200 may generate code comment nodes 840a-f (block 1120) and associate the comment nodes 840a-f with various sites in the IR 800 (FIG. 8B). The comment nodes may include comments generated by the ME 200 using the above acquired rules. Thus, for example, ME 200 may generate comment node 840a, generate the comment "/* Signal A */", and associate the comment with the node 840a, as described above.

ME 200 may then apply one or more optimizations to the IR 800 (block 1125). For example, ME 200 may apply a buffer reuse optimization, as described above, to the IR 800 to produce an optimized version of the IR 800 as illustrated in FIG. 8C.

ME 200 may determine whether comments are to be included in code that is generated from the IR 800 (block 1130). As noted above, the comments are to be included in-line with the generated code so ME 200 generates the code with the comments in-line (block 1135). Specifically, ME 200 may generate the code with the comments by visiting nodes in the IR 800 in a particular order, generate code from the entity and operation nodes, and include comments associated with the generated code from the comment nodes.

Figure 12:
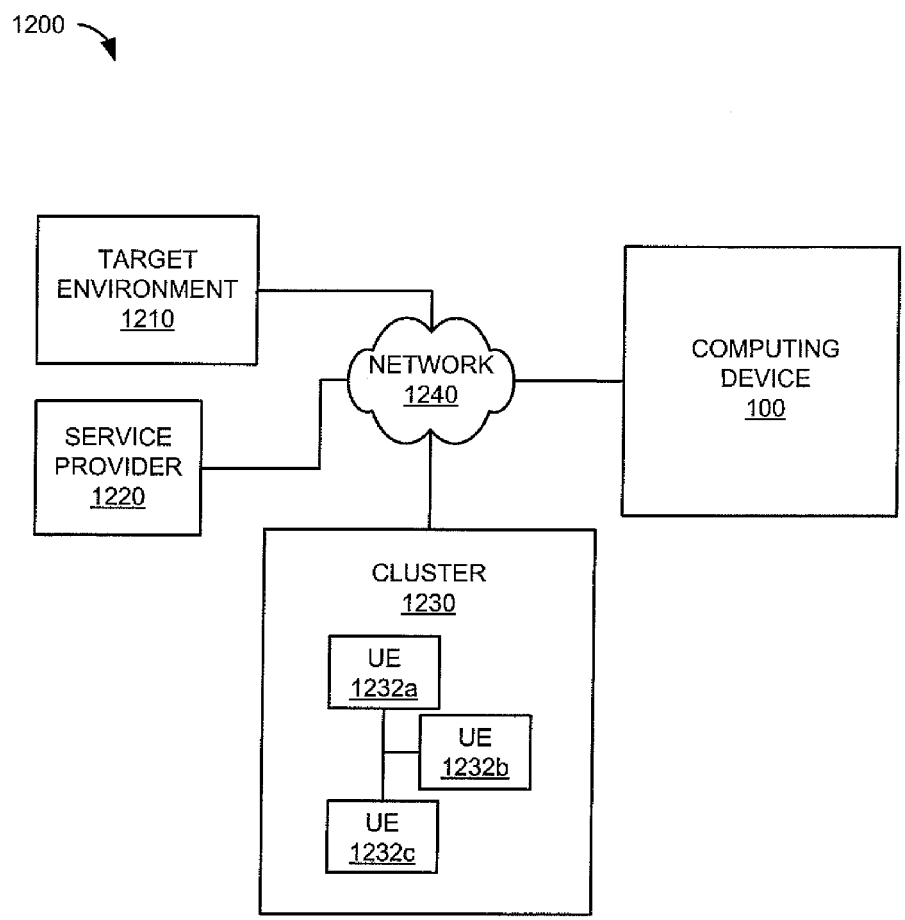
FIG. 12 illustrates an example of a distributed environment that may be configured to implement one or more embodiments of the invention.

One or more embodiments of the invention may be implemented in a distributed environment. FIG. 12 illustrates an example of a distributed environment 1200 that may be configured to implement one or more embodiments of the invention. Referring to FIG. 12, environment 1200 may contain various entities including computing device 100, target environment 1210, service provider 1220, cluster 1230, and network 1240. Note that the distributed environment 1200 is just one example of a distributed environment that may be used with embodiments of the invention. Other distributed environments that may be used with embodiments of the invention may contain more entities, fewer entities, entities in arrangements that differ from the arrangement illustrated in FIG. 12, and so on. Moreover, the distributed environments may be configured to implement various "cloud computing" frameworks.

Details of computing device 100 were described above with respect to FIG. 1. In distributed environment 1200, computing device 100 may be configured to, among other things, exchange information (e.g., data) with other entities in network 1240 (e.g., target environment 1210, service provider 1220, and cluster 1230). Computing device 100 may interface with the network 1240 via communication interface 180.

Target environment 1210 may be configured to execute and/or interpret a compiled version of a model, such as model 300, which may be generated in or otherwise available to the distributed environment 1200. The network 1240 may include a communication network capable of exchanging information between the entities in the network 1240. The network 1240 may include digital and/or analog aspects. The information may include machine-readable information having a format that may be adapted for use, for example, in the network 1240 and/or with one or more entities in the network 1240. For example, the information may be encapsulated in one or more packets that may be used to transfer the information through the network 1240.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, IEEE 802.16, etc.

The network 1240 may comprise various network devices, such as gateways, routers, switches, firewalls, servers, repeaters, address translators, etc. Portions of the network 1240 may be wired (e.g., using wired conductors, optical fibers, etc.)

and/or wireless (e.g., using free-space optical (FSO), radio frequency (RF), acoustic transmission paths, etc.). Portions of network 1240 may include a substantially open public network, such as the Internet. Portions of the network 1240 may include a more restricted network, such as a private corporate network or virtual private network (VPN). It should be noted that implementations of networks and/or devices operating on networks described herein are not limited with regards to information carried by the networks, protocols used in the networks, the architecture/configuration of the networks, etc.

The service provider 1220 may include logic that makes a service available to another entity in the distributed environment 1200. The service provider 1220 may also include a server operated by, for example, an individual, a corporation, an educational institution, a government agency, and so on, that provides one or more services to a destination, such as computing device 100. The services may include software containing computer-executable instructions that implement one or more embodiments of the invention or portions thereof, and may be executed, in whole or in part, by (1) a destination, (2) the service provider 1220 on behalf of the destination, or (3) some combination thereof.

For example, in an embodiment, service provider 1220 may provide one or more subscription-based services that may be available to various customers. The services may be accessed by a customer via network 1240. The customer may access the services using a computer system, such as computing device 100. The services may include services that implement one or more embodiments of the invention or portions thereof. The service provider 1220 may limit access to certain services based on, e.g., a customer service agreement between the customer and the service provider 1220.

The service agreement may allow the customer to access the services that may allow the customer to build, execute, and/or analyze a model, such as model 300, as described above. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources or network bandwidth used.

Cluster 1230 may include a number of units of execution (UEs) 1232 that may perform processing of one or more embodiments of the invention or portions thereof on behalf of computing device 100 and/or another entity, such as service provider 1220. The UEs 1232 may reside on a single device or chip or on multiple devices or chips. For example, the UEs 1232 may be implemented in a single ASIC or in multiple ASICs. Likewise, the UEs 1232 may be implemented in a single computer system or multiple computer systems. Other examples of UEs 1232 may include FPGAs, CPLDs, ASIPs, processors, multiprocessor systems-on-chip (MPSoCs), System in Package (SiP), graphics processing units, microprocessors, etc.

The UEs 1232 may be configured to perform operations on behalf of another entity. For example, in an embodiment, the UEs 1232 are configured to execute portions of code associated with the ME 200. Here, the ME 200 may dispatch certain activities pertaining to one or more embodiments of the invention to the UEs 1232 for execution. The service provider 1220 may configure cluster 1230 to provide, for example, the above-described services to computing device 100 on a subscription basis (e.g., via a web service).

It should be noted that comments may be generated, as described above, for attributes, such as sample times or other attributes and/or properties of an entity in a model that may be derived. Note that the attributes and/or properties may be derived based on relations with other entities in the model (e.g., when the attribute and/or property is set to be inherited). In addition, the generated comments may constitute directives for further processing of code that is generated for the model. For example, the comments may constitute directives, for example, for checking the model or an abstract interpretation of the model. Moreover, simulation information (e.g., data) may be inserted into the comments. For example, range analysis information from a simulation or an abstraction interpretation may be generated into the comments. Also, proof results such as, for example, invariant analysis results of code may be generated into code.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 10 and 11A-B, the order of the acts may be modified in other implementations. Further, non-dependent acts may be performed in parallel.

Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as "logic" that performs one or more functions. This logic may be hardware-based, software-based, or a combination of hardware-based and software-based. The logic may be stored in one or more tangible computer-readable storage media and may include computer-executable instructions that may be executed by processing logic, such as processing logic 120. The computer-executable instructions may be configured to implement one or more embodiments of the invention. The tangible computer-readable storage media may be volatile or non-volatile and may include, for example, flash memories, magnetic tape, removable disks, non-removable disks, or other tangible computer-readable storage media.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium that stores computer-executable instructions, the instructions comprising:

one or more instructions which, when executed by a processor, cause the processor to:
generate a representation of a model,
the model including a plurality of nodes;
generate code based on the generated representation of the model;
generate a comment associated with at least one of the plurality of nodes included in the model,
the comment being generated based on at least:
a structural usage of a node, of the plurality of nodes, associated with the model, and
a rule that is associated with the structural usage of the node;
determine whether the generated comment should be included in the generated code; and
provide, when the generated comment should be included in the generated code, the generated code and the generated comment.

2. The non-transitory medium of claim 1, where the node is associated with a parameter associated with the model, a state associated with the model, or a signal associated with the model.

3. The non-transitory medium of claim 1, where the rule is a property of the node.

4. The non-transitory medium of claim 1, where the rule includes user-specified information that is used to generate the comment.

5. The non-transitory medium of claim 1, where the rule includes information that indicates for what instances of the structural usage of the node that the comment is generated.

6. The non-transitory medium of claim 1, where the model is an executable model.

7. The non-transitory medium of claim 1, where the model is a graphical model.

8. The non-transitory medium of claim 1, where the model is at least one of a time-based graphical block diagram model, a state transition diagram, a discrete event model, an activity diagram, a Unified Modeling Language (UML) diagram, a sequence diagram, a data flow model, a statechart, a dataflow diagram, sequential function chart, or a class diagram.

9. The non-transitory medium of claim 1, where the rule is associated with a script.

10. The non-transitory medium of claim 9, where the instructions further comprise:
one or more instructions to execute the script to at least one of:
acquire information that is used to generate the comment, or
generate at least part of the comment.

11. The non-transitory medium of claim 1, where the rule includes one or more tokens that are used to represent one or more attributes of the model or one or more attributes of nodes associated with the model that are included in the comment.

12. The non-transitory medium of claim 11, where the one or more attributes include at least one of attribute name, root model name, system hierarchy level, data type acronym, or node identifier.

13. The media non-transitory medium of claim 1, where the structural usage is at least one of:
a read operation associated with the node,
a write operation associated with the node, or
a reference operation associated with the node.

14. The media non-transitory medium of claim 1, where the one or more instructions to provide the generated code and the generated comment include:
one or more instructions to incorporate the generated comment:
inline with the generated code,
before the generated code, or
after the generated code.

15. The non-transitory medium of claim 14, where the generated code includes code generated in at least one of MATLAB® language, ADA, C, C++, Java, hypertext markup language (HTML), extensible markup language (XML), a hardware description language (HDL), SystemC, or an International Electrotechnical Commission (IEC) 61131-3 language.

16. The non-transitory medium of claim 1, where the instructions further comprise:
one or more instructions to store the generated code and the generated comment.

17. A method comprising:
generating a representation of a model,
the model including a plurality of nodes, and
the generating being performed by a computing device;
generating code based on the generated representation of the model,
the generating the code being performed by the computing device;
acquiring a rule that is associated with at least one of the plurality of nodes,
the acquiring being performed by the computing device;
generating a comment associated with the at least one of the plurality of nodes, the comment being generated based on at least:
a structural usage of a node, of the at least one of the plurality of nodes associated with the model, and
the rule,
the generating the comment being performed by the computing device;
determining whether the generated comment should be included in the generated code, the determining being performed by the computing device; and
providing, when the generated comment should be included in the generated code, the generated code and the generated comment,
the providing being performed by the computing device.

18. The method of claim 17, where the node is associated with a parameter associated with the model, a state associated with the model, or a signal associated with the model.

19. The method of claim 17, where the rule is associated with a script and the method further comprises:
executing the script based on the rule.

20. The method of claim 19, further comprising:
using the executed script to at least one of:
acquire information that is used to generate the comment, or
generate at least part of the comment.

21. The method of claim 17, where the structural usage is at least one of:
a read operation associated with the node,
a write operation associated with the node, or
a reference operation associated with the node.

22. The method of claim 17, further comprising:
storing the generated code and the generated comment.

23. A system comprising:
a device to:
generate a representation of a model,
the model including a plurality of nodes;
generate code based on the generated representation of the model;
generate a comment associated with at least one of the plurality of nodes included in the model, the comment being generated based on at least:

a structural usage of a node, of the plurality of nodes, associated with the model, and a rule that is associated with the structural usage of the node;

determine whether the generated comment should be included in the generated code; and provide, when the generated comment should be included in the generated code, the generated code and the generated comment.

24. The system of claim 23, where the node is associated with a parameter associated with the model, a state associated with the model, or a signal associated with the model.

25. The system of claim 23, where the rule is associated with a script and wherein the device is further to:

execute the script based on the rule.

26. The system of claim 23, where the structural usage is at least one of:

a read operation associated with the node, a write operation associated with the node, or a reference operation associated with the node.

27. A device comprising:

a memory storing instructions; and a processor to execute the instructions to:

generate a representation of a model, the model including a plurality of nodes;

generate code based on the generated representation of the model;

generate a comment associated with at least one of the plurality of nodes included in the model, the comment being generated based on at least:

a structural usage of a node, of the plurality of nodes, associated with the model, and a rule that is associated with the structural usage of the node;

determine whether the generated comment should be included in the generated code; and provide, when the generated comment should be included in the generated code, the generated code and the generated comment.

28. The device of claim 27, where the node is associated with a parameter associated with the model, a state associated with the model, or a signal associated with the model.

29. The device of claim 27, where the rule is associated with a script and the processor is further to:

execute the script based on the rule.

30. The device of claim 27, where the structural usage is at least one of:

a read operation associated with the node, a write operation associated with the node, or a reference operation associated with the node.

* * * * *

UNITED STATES PATENT AND TRADEMARK OFFICE
CERTIFICATE OF CORRECTION

PATENT NO. : 8,510,706 B1
APPLICATION NO. : 12/554547
DATED : August 13, 2013
INVENTOR(S) : Andrew C. Bartlett It is certified that error appears in the above-identified patent and that said Letters Patent is hereby corrected as shown below:

In the Claims

Column 17, claim 13, line 58 should read: "The non-transitory medium of claim 1, where the"

Signed and Sealed this
First Day of October, 2013

Teresa Stanek Rea
*Deputy Director of the United States Patent and Trademark Office*